(12) United States Patent
Bruning (10) Patent No.: US 6,989,801 B2
(45) Date of Patent: Jan. 24, 2006

(54) TWO-WAY PRESENTATION DISPLAY SYSTEM

(75) Inventor: Gert Bruning, Sleepy Hollow, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 631 days.

(21) Appl. No.: 09/814,900

(22) Filed: Mar. 22, 2001

(65) Prior Publication Data

US 2002/0135536 A1 Sep. 26, 2002

(51) Int. Cl.
*G09G 5/00* (2006.01)

(52) U.S. Cl. .................... 345/2.1; 345/173; 178/18.01; 178/18.03; 348/14.08; 348/14.09; 709/200; 709/204; 715/733; 715/744

(58) Field of Classification Search ........ 345/156–157, 345/173, 179, 2.1–2.3, 1.1, 1.2, 730, 732, 345/733, 744, 751; 178/18.01, 18.1, 18.03, 178/19.01–19.05; 348/744, 776, 14.08, 14.09; 709/200, 204, 205, 208, 227, 229

See application file for complete search history.

(56) References Cited

U.S. PATENT DOCUMENTS

| | | | | |
|---|---|---|---|---|
| 4,846,694 A | | 7/1989 | Erhardt ........................ 434/365 |
| 4,953,971 A | | 9/1990 | Highfill ........................ 353/122 |
| 5,204,768 A | * | 4/1993 | Tsakiris et al. ................ 359/148 |
| 5,359,550 A | | 10/1994 | Chen .......................... 364/708.1 |
| 5,526,023 A | * | 6/1996 | Sugimoto et al. ............ 345/173 |
| 5,528,266 A | | 6/1996 | Arbeitman et al. ........... 345/173 |
| 5,736,968 A | * | 4/1998 | Tsakiris ........................ 345/2.2 |
| 5,738,429 A | | 4/1998 | Tagawa et al. ............... 353/122 |
| 5,767,897 A | | 6/1998 | Howell ........................... 348/15 |
| 5,818,421 A | | 10/1998 | Ogino et al. ................. 345/157 |
| 5,818,425 A | * | 10/1998 | Want et al. ................... 345/158 |
| 6,091,408 A | | 7/2000 | Treibitz et al. .............. 345/329 |
| 6,104,447 A | | 8/2000 | Faris .............................. 349/5 |
| 6,108,687 A | * | 8/2000 | Craig ........................... 709/203 |
| 6,141,000 A | | 10/2000 | Martin ......................... 345/178 |
| 6,172,668 B1 | | 1/2001 | Baur ........................... 345/182 |
| 6,411,988 B1 | * | 6/2002 | Tafoya et al. ............... 709/204 |
| 6,560,637 B1 | * | 5/2003 | Dunlap et al. ............... 709/204 |
| 6,654,785 B1 | * | 11/2003 | Craig .......................... 709/203 |
| 2002/0140724 A1 | * | 10/2002 | Qureshi et al. .............. 345/730 |

OTHER PUBLICATIONS

"Use of instructional material in universal teleteaching environments" by Robert Grebner, Computer Networks and ISDN Systems, 1997, pp. 1787-1797.

* cited by examiner

*Primary Examiner*—Henry N. Tran (57) ABSTRACT

The present invention provides for a presentation display system comprised of a display screen for displaying an electronic presentation and a presentation device configured to provide the electronic presentation. An input screen is coupled to the presentation device such that when a user enters a notation on the input screen the presentation device incorporates the notation into the electronic presentation. In addition, a projection unit can be coupled to the presentation device configured to project the electronic presentation onto the display screen, where the input screen is coupled to the projection unit such that when a user enters a notation on the input screen the projection unit incorporates the notation into the electronic presentation and projects the electronic presentation onto the display screen.

6 Claims, 8 Drawing Sheets

TWO-WAY PRESENTATION DISPLAY SYSTEM

FIELD OF THE INVENTION

The present invention is directed to a two-way presentation display system. More specifically, the present invention is directed to a two-way presentation system for interactive presentations having a touch-screen functionality.

BACKGROUND OF THE INVENTION

It is well known in the art, that there are many methods for performing a display presentation. Such methods include but are not limited to slide projection, overlay/overhead projection, LCD projection, and projection directly from PC digital information. An LCD projection presentation method refers to a projection which is cast onto a display screen via light projection passed through a LCD screen. In regard to the direct digital image from a PC, a desktop or laptop computer is directly connected to a projection system which converts the images on the PC monitor into a light projection which is in turn displayed upon a display screen. In both the LCD projection, and the digital PC image projection methods it is common for a user to use a programmed electronic presentation method such as Microsoft PowerPoint (TM) or other such computerized slide programs.

However, one drawback to these programs is that unlike slide projection devices, where a user can add notations on the slides while displaying the image, once the slides are generated they can not be easily or quickly changed during the presentation, for example, by adding comments, mark ups, and other notations on the image directly. As such, any modification requires the use of edit functions provided by the computerized slide program. Additionally, another drawback is that the usual setting for such presentations involves a large crowd of viewers who are forced to follow the presentation on the display screen or with a printout copy of the slide show that they received before the presentation. This format makes it difficult for presentation participants to present questions or direct attention to the particular details of a given slide.

Therefore, there exists a need for presenting electronic presentations or seminars in an interactive manner allowing for real time corrections, additions, or new slides to be made by the presenter or the attendees during the course of the presentation or seminar.

SUMMARY OF THE INVENTION

To this end, it is an object of the present invention to provide a system and method for presenting and displaying an electronic presentation, such as a Microsoft PowerPoint presentation. To this end, it is an object of the present invention to overcome the deficiencies of the prior art by providing an interactive presentation format which allows a presenter to note or mark a presentation slide by way of light pen and touch screen, such that a presenter can alter the slide presentation without additional programing and without physically leaving the presentation device or PC running the presentation. It is another object of the present invention to provide a remote electronic means to follow an electronic presentation such as a laptop or Palm Pilot (TM) where audience members are networked to the presentation device or the PC running the presentation. This provides a means for the attendee to view and mark the slide, the marking of which is in turn added to the original image to be displayed on the main presentation and on the monitors of the other remote electronic means carried by the remaining attendees.

In one embodiment of the present invention, a display system is provided comprising a display screen for displaying an electronic presentation and a presentation device configured to provide the electronic presentation. The presentation device has an input screen attached thereto such that when a user enters a notation on the input screen, the presentation device incorporates the notation into the electronic presentation. The display screen can be any one of a projection screen, an Liquid Crystal Display (LCD) screen or a digital display screen. The presentation device is preferably a Personal Computer (PC) configured to operate an electronic presentation program, with the electronic presentation program being an electronic presentation slide program.

The input screen can be any one of a touch screen or a light input screen, where the input screen is interfaced by an input device. The input device can be any one of a stylus, a user's finger or and a light pen. The input screen can be any one of a monitor for said presentation device or a module coupled to said presentation device, where the input screen configured to receive the notations via the input device and communicate the notations to the presentation device.

In another embodiment of the present invention the display system is comprised of a display screen for displaying an electronic presentation, a presentation device configured to provide the electronic presentation, a projection unit coupled to the presentation device configured to project the electronic presentation onto the display screen, and an input screen coupled to the projection unit such that when a user enters a notation on the input screen, the projection unit incorporates the notation into the electronic presentation and projects the electronic presentation onto the display screen.

The projection unit is further comprised of an interface unit configured to interface the projection unit with any external devices, a projection unit memory module, and a projection unit processor, said projection unit processor configured to a conveys an image formed from the incorporated notation and electronic presentation to the presentation device via the interface.

The input screen can be any one of a touch screen or a light input screen, where the input screen is interfaced with by an input device. The input device being any one of a stylus, a user's finger or a light pen.

In another embodiment of the present invention a presentation display system comprises a display screen for displaying an electronic presentation and a presentation device configured to provide the electronic presentation. The presentation device has an input screen attached thereto such that when a presenter enters a presenter notation on the input screen said presentation device incorporates the presenter notation into the electronic presentation. The display system is also provided with a presentation network device configured to network a plurality of remote user nodes to the presentation device. The presentation network device is configured to provide an electronic display information from the electronic presentation to each of the plurality of remote user nodes.

The presentation network device is configured to provide the presentation device and the remote user nodes with viewer notations created at any one of the remote user nodes such that the presentation device and the remaining remote user nodes displaying the electronic presentation will also display the added viewer notations. The presentation device is preferably a Personal Computer (PC) configured to operate an electronic presentation program.

The presentation network device is provided with a network interfacing unit coupled to the presentation device and the remote user nodes so as to provide two-way communication between the presentation device and the remote user nodes. The presentation network device is further comprised of a processor module configured to operate the software and hardware functions of the presentation network device. The presentation network device further comprises a presentation device interface configured to couple the presentation device to the processor module. The presentation network device further comprises a remote user node interface configured to couple the remote user nodes to the processor module.

The presentation network device further comprises a memory module coupled to the processor module configured to provide necessary memory to the processor module for use with presentation network device hardware and software functions.

The remote user nodes are either links for attaching a personal viewing device to the presentation display system or personal viewing devices themselves. The personal viewing devices being any one of a Personal Computer (PC), a handheld computer/organizer or a Notebook computer. The plurality of the remote user nodes are located in different geographic location from the presentation device, and remaining the remote user nodes.

DETAILED DESCRIPTION

In one embodiment of the present invention a presentation display system 10 is provided for displaying an electronic presentation on a display screen 12. System 10 is comprised of a presentation device 14, display screen 12, input screen 16 attached to presentation device 14 and a projection unit 18. System 10 is configured to provide a means to add notations and markings to any one of a plurality of displays in an electronic presentation by simply employing a marking unit 20 against input screen 16, such that edits or markings will appear in conjunction with the original display from the electronic presentation thus allowing easy corrections and highlighting of material on a display in an electronic presentation.

Individual Presentation Display System

Structure

Figure 1:
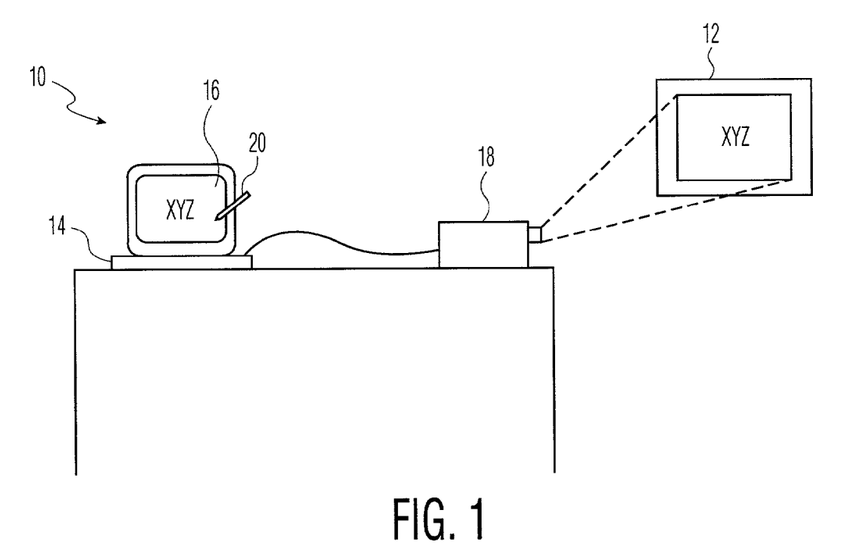
FIG. 1 is a display system in accordance with one embodiment of the present invention.

As illustrated in FIG. 1, system 10 is comprised of presentation device 14, which is configured to operate an electronic presentation system such as Microsoft Power-Point (TM) electronic slide presentation program. Presentation device 14 can be either a laptop computer a desktop PC or any other device capable of running an electronic presentation program. For illustrative purposes, presentation device 14 is a laptop or notebook computer running the Microsoft Windows OS (TM) and the electronic presentation program is Microsoft PowerPoint (TM) electronic slide presentation system. However it should be noted that these are illustrative examples only and any presentation device capable of operating an electronic presentation program is within the contemplation of the present invention.

During a presentation, presentation device 14 is attached to projection unit 18 which projects the image, as seen on the monitor of presentation device 14, onto display screen 12, allowing all of the attendees in a meeting to see an electronic presentation. For illustrative purposes the term attendee will generically refer to all attendees of any type of event which involves the use of an electronic presentation via system 10.

Projection unit 18, as seen in FIG. 1 is an electronic projection unit coupled to presentation device 14 and is configured to receive digital data from presentation device 14 so as to covert the data to an image for projection onto display screen 12. To this end, projection unit 18 receives information corresponding to the same image as the image displayed on the monitor of presentation device 14 and projects the image onto display screen 12 via the use of an internal light source. However, other methods using various types of projection unit 18 are available. Digital projection unit 18 described here and shown in FIG. 1 is intended only as an example, and is no way intended to limit the scope of the present invention. Any projection unit 18 which is capable of projecting the images of the electronic presentation stored in presentation device 14 onto display screen 12 is within the contemplation of the present invention.

Display screen 12, as illustrated in FIG. 1, is a simple grey or white screen for use in displaying the images of the electronic presentation as projected onto it by projection unit 18. Display screen 12 can be of any size or color, so long as it properly functions as a display screen, Display screen 12, can even be a simple wall in the room where the electronic presentation is being given, provided it is of a color and dimension proper for displaying such images.

Coupled to presentation device 14 is input screen 16, which is configured to both display the images of the electronic presentation and also to allow the presenter to manually enter corrections, sketches, editing lines, or any other markings or notations directly to the electronic presentation slides by simply touching the screen with an appropriate marking unit 20. As illustrated in FIG. 1, input screen 16 and the monitor of presentation device 14 are the same. In this case presentation device 14 is a laptop where the monitor is both an display and an input screen 16 that accepts at least one type of direct input from a marking unit 20, such as light pen or stylus. To this end, input screen 16 not only displays the images of the electronic presentation, but also allows a user to directly enter editing marks onto the presentation images altering or adding to them.

Input screen 16 can have several method of input such as touch, light source or other such devices which allow a user to enter notations on top of the display image where it can be subsequently erased, moved, edited or saved as a permanent addition to the original material in the presentation image. To this end, marking unit 20 can be any device which can be used to input information onto input screen 16 such as a light pen or stylus or even the users finger. It should be noted however, that input screen 16 does not refer simply to a functional command touch screen as are widely used in information kiosks or ATM machines, but instead refer to screens which can actually interpret input movement and allow presentation device 14 to enter lines and figures directly on top of the images from the electronic presentation.

Control of input screen 16 is handled by presentation device 14. To this end, presentation device 14, controls the functional aspects of input screen 16, such as when to turn touch input features on and off, editing touch input lines and figures, changing color display of added notations, input screen program control functions and other such functions that input screen 16 can perform.

Figure 2:
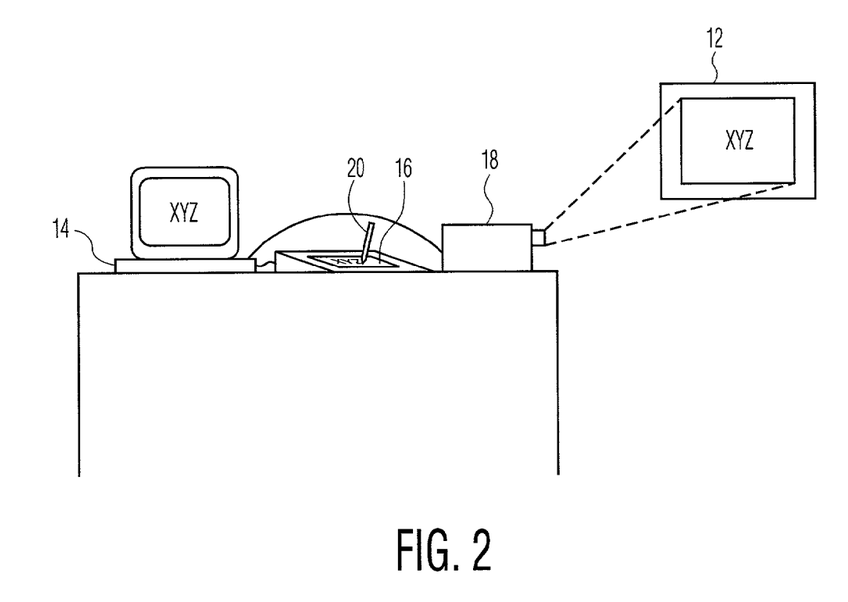
FIG. 2 is a displays system in accordance with another embodiment of the present invention.

In an alternative embodiment of the present invention, as illustrated in FIG. 2, input screen 16 can be a separate device from the monitor of presentation device 14. In such a case, the images of the electronic presentation are displayed on three devices, the monitor of presentation device, input screen 16, and display screen 12. This configuration can be used in situations where the PC or laptop presentation device 14 is not equipped with a manual screen input means. Input screen 16 can be coupled to presentation device 14 as separate hardware adding the touch edit/draw feature. In operation presentation device 14 displays the images from the electronic presentation on its monitor, display screen 12 and input screen 16. When a presenter wants to add lines or edits to an image they simply enter the edits by the appropriate manual means and the image is updated simultaneously on all three image displays.

The alternative embodiment for input screen 16, illustrated in FIG. 2, is advantageously used when presentation device does not already have a manual input screen 16 embedded within, so as to allow older PC's and laptop presentation devices 14 to be updated for use in system 10. For illustrative purposes, the embodiment shown in FIG. 1 where input screen 16 is the same unit as the monitor for presentation device 14 will be used throughout the description of the present invention, however it should be noted that either configuration will operate in a substantially similar manner without affecting the remaining features of system 10.

In either embodiment illustrated in FIG. 1 or 2 in addition to adding notations to a preexisting image from a presentation, a presenter using presentation device 14 can use a fresh blank slide. In such a case, the presenter can make notations or marks similar to those that would be used in conjunction with preexisting images, however, this feature allows more versatility to the presentation program allowing for completely new manually drawn slides to be incorporated. The newly created slide can be saved into the electronic presentation program as a new slide or if the blank slide was only being used for scrap illustrations or calculations it can be deleted.

Upon completion of the notations, markings or edits on either the preexisting images or on the blank slides, presentation device 14 can store the original image and the new notations as a combined image as a new single image. In the case of notations on a blank slide this will simply require saving of the new marks. In the case of notations made to a preexisting image from the presentation, if saved, the new notations will be combined with the original image to create a single new edited image. Various additional saving options can also be used in presentation device 14 such as saving the notations as a separate file, not affecting the original image. Any saving method handled by presentation device 14 to save notations made by a presenter for use with system 10 is within the contemplation of the present invention.

Figure 3A:
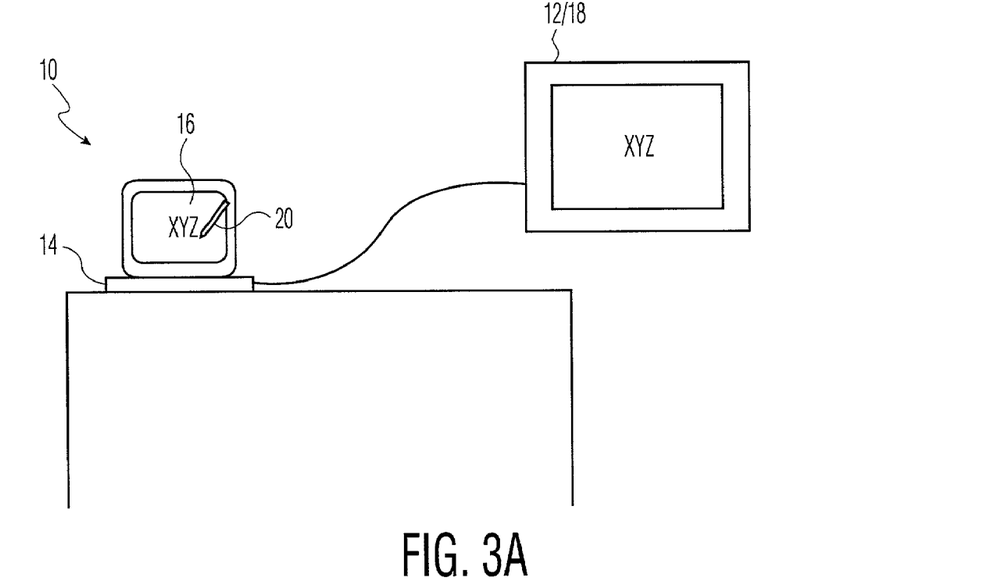
FIG. 3A is a displays system in accordance with another embodiment of the present invention.

It should be noted that it is possible to combine the functional elements of projection unit 18 and display screen 12. In an alternative embodiment pictured in FIG. 3a, presentation device 14 is directly coupled to display screen 12, which is LCD (Liquid Crystal Display), DT (Digital Television), HDTV (High Definition Television) or other similar device capable of directly displaying the images from the digital output of presentation device 14 onto itself. These formats for display screen 12 are more costly and tend to be more limited in size, however they may be useful in small conference settings or similar situations.

Where display screen 12 is capable of displaying images on its own, instead of having images projected onto it by projection unit 18, display screen 12 is directly electronically coupled to presentation device 14. Using the digital data from presentation device 14, display screen 12 then displays the same image as the image displayed on the monitor of presentation device 14 through the use of its own internal components.

Although the alternative method of displaying the electronic presentation to the attendees, as seen in FIG. 3a, may be favored over the arrangement described in FIG. 1, for illustrative purposes system 10 will be described using both display screen 12 and projection unit 18. However, it should be noted that either configuration will operate in substantially similar manners, and can be easily interchanged in accordance with each particular presentation situation.

Figure 3B:
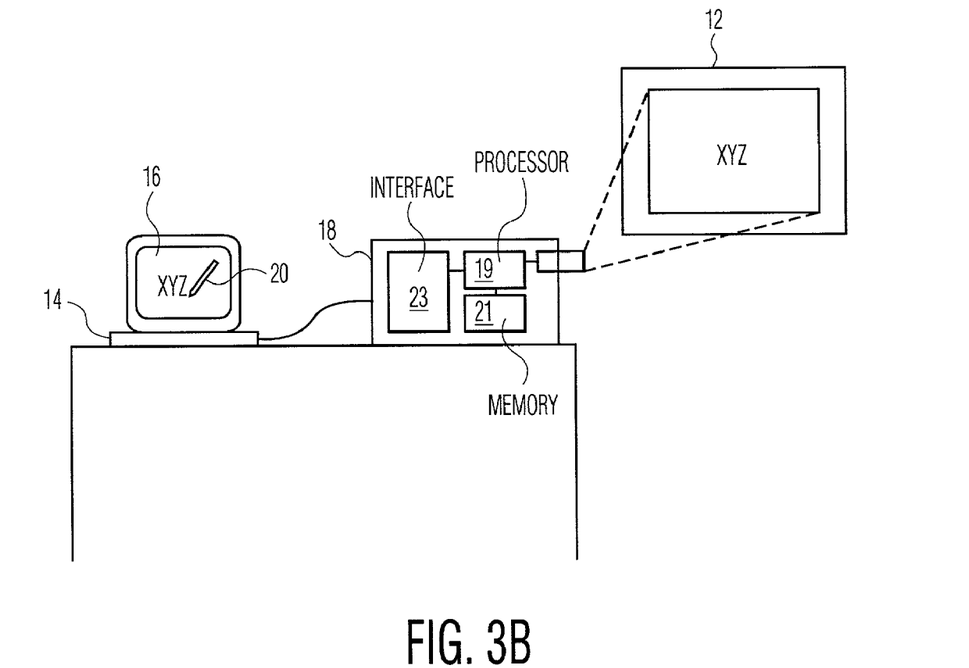
FIG. 3B is a displays system in accordance with another embodiment of the present invention.

In another embodiment of the present invention, as illustrated in FIG. 3b, projection unit 18 of system 10 has a projection unit processor 19, projection unit memory module 21 and an interface 23 disposed therein. Projection unit processor 19 is configured to control the functions of projection unit 18 and to maintain the manual edit information. In the basic configuration illustrated in FIG. 1 projection unit 18 is simply a projection device which projects the electronic presentation images based on compiled results of both the original image and the image of the added modification as created in presentation device 14. In the configuration of system 10 displayed in FIG. 3b, projection unit 18 has its own projection unit processor 19 and projection unit memory module 21 which are configured to store both the original images of the electronic presentation and the images from the manual edits. Projection unit 18 creates a new image by overlaying the manual edit information over the presentation image using its own projection unit processor 19. In either configuration the end result is that the display screen 12 displays the corrected or edited image of the original presentation image and the manual edits.

This configuration provides a user with additional options, which are particularly useful when upgrading previously owned equipment to include the necessary components for system 10. For example, the alternative embodiment illustrated in FIG. 3b allows a presenter to upgrade a standard PC or notebook computer with no projection functions by simply adding projection unit 18 and installing the necessary software on presentation device 14. Although either configuration will work, for illustrative purposes projection unit 18 will refer to the simple projection device as illustrated in FIG. 1.

Figure 3C:
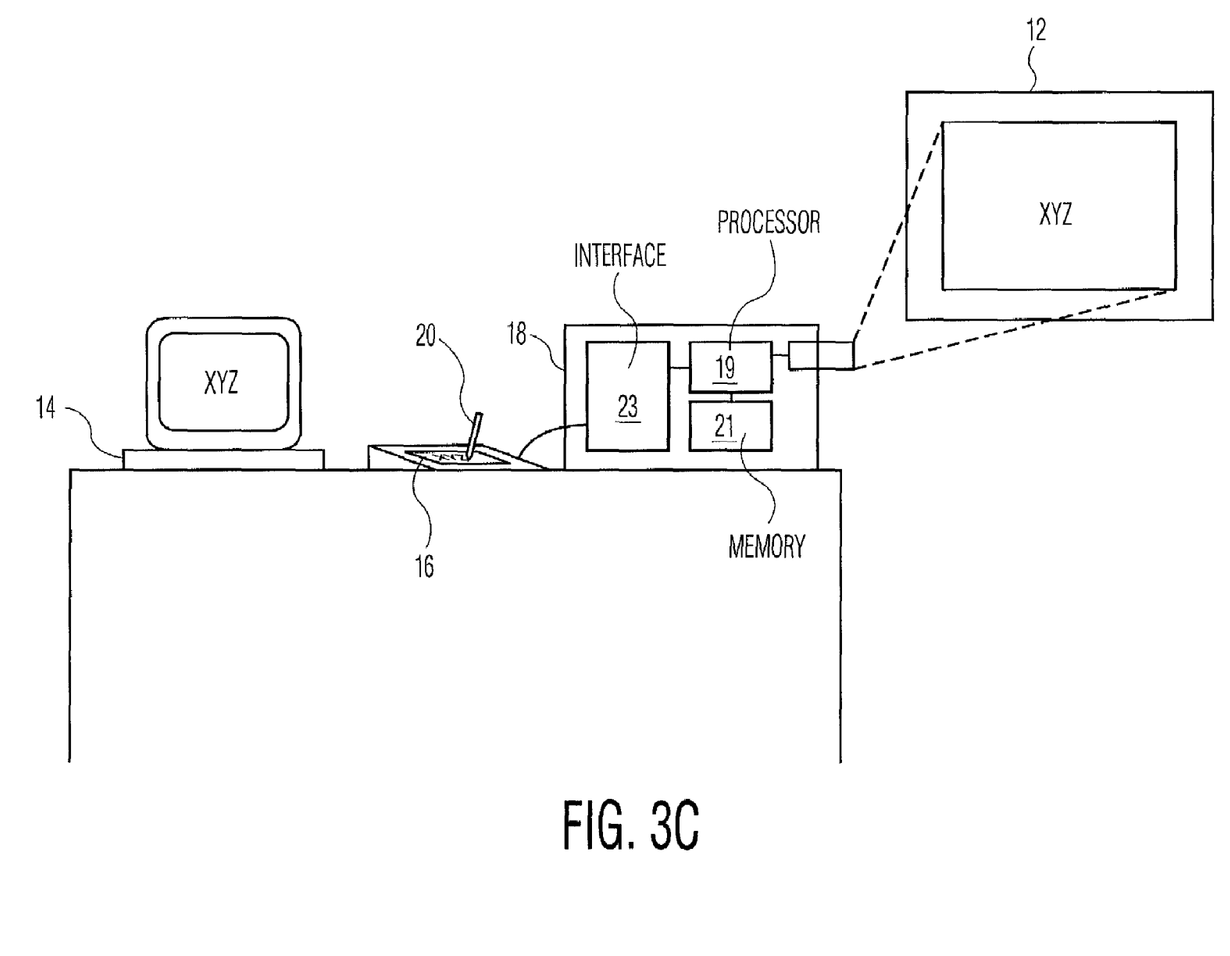
FIG. 3C is a displays system in accordance with another embodiment of the present invention.

In another embodiment of the present invention, as illustrated in FIG. 3c, projection unit 18 of system 10 has a projection unit processor 19, projection unit memory module 21 and an interface 23 disposed therein, similar to the configuration illustrated in FIG. 3b. Projection unit processor 19 is configured to control the functions of projection unit 18 and to maintain the manual edit information. Input screen 16 is also coupled to projection unit 18, and configured to directly provide the manual edit information to projection unit processor 19. Unlike the configuration illustrated in FIG. 3b, in the configuration provided in FIG. 3c the Projection unit 18 creates a new image after receiving input data from input device 16 which is coupled directly to projection unit 18 via interface 23. The new image is created by overlaying the manual notation information over the presentation image by employing projection unit processor 19. In any one of the three configurations, the end result is that the display screen 12 displays the original presentation image and the manual edits or notations.

This configuration provides a user with additional options, which are particularly useful when upgrading previously owned equipment to include the necessary components for system 10. For example, the alternative embodiment illustrated in FIG. 3c allows a presenter to upgrade a standard PC or notebook computer that does not have input screen technology, i.e. touch sensitive or light sensitive, or projection capabilities by simply adding projection unit 18 with coupled input screen 16 and installing the necessary software on presentation device 14. Although any one of these configurations will work, for illustrative purposes projection unit 18 will refer to the simple projection device as illustrated in FIG. 1.

Operation

Figure 4:
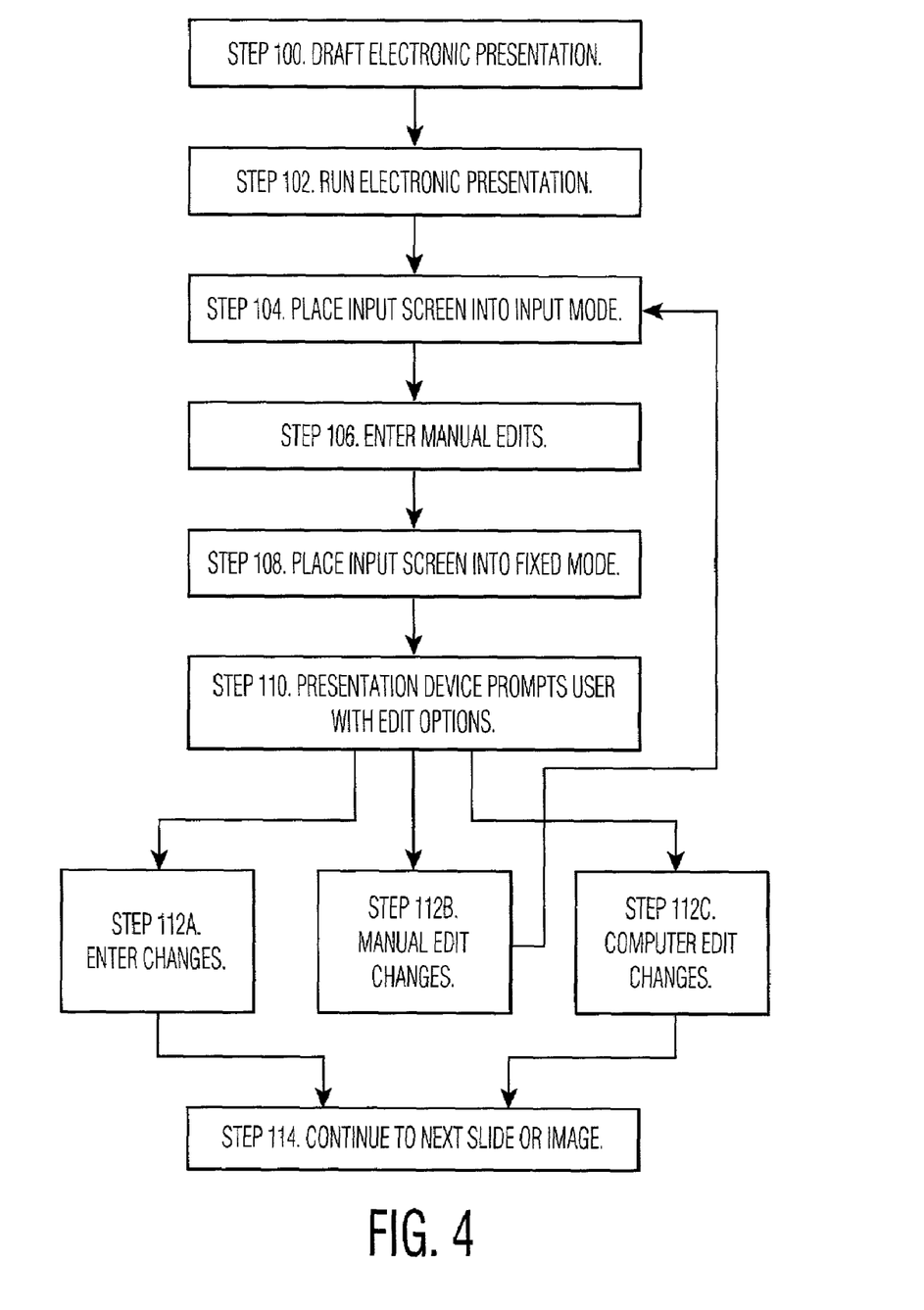
FIG. 4 is a flow diagram of the operation of a display system in accordance with one embodiment of the present invention.

In one embodiment of the present invention as illustrated in FIG. 4, a presenter begins operation of system 10 at step 100, by creating an electronic presentation on presentation device 14 or another compatible device on which the presentation can be saved and then replayed on presentation device 14.

Next, at step 102, the presenter begins operation of system 10 by running the electronic presentation on presentation device 14 such that the images from the electronic presentation are projected via projection unit 18 onto display screen 12 allowing the attendees of the conference or seminar to view the individual presentation slides. The presentation continues using the normal methods of conducting a seminar or presentation until an event occurs in which the presenter is required to edit a slide, highlight an area of the slide, complete the slide, add or work on a new blank slide or add a notation or any other function which would ordinary require reprogramming or computer editing of the electronic presentation slide.

At step 104, the presenter places input screen 16 into input mode, via control functions from presentation device 14. In input mode, input screen 16 is sensitive to touch, light or other physical stimulus. Next, at step 106, the presenter enters lines or figures onto input screen 16 using marking device 20. The markings placed on input screen 16 are then incorporated by presentation device 14, altering the electronic presentation image to include the new manually drawn material, as displayed on display screen 12, on input screen 16 and on the monitor of presentation device 14 if this is a separate component from input screen 16.

At step 108, after the presenter completes the manual drawing on input screen 16, the presenter places input screen 16 into a fixed mode via controls in presentation device 14. In fixed mode, input screen 16 is not sensitive to any manual input, so as to prevent unwanted accidental touching and other inadvertent contact from becoming a permanent part of the images of the electronic presentation.

Sometime thereafter, either after each manual input or at some other designated interval as controlled by the presenter via controls on presentation device 14, at step 110, presentation device 14 prompts the presenter to select from a series of options as to how to proceed with the newly added material At step 112a, if the user chooses the enter changes option, presentation device 14 saves the editing lines and figures entered by the presenter, such that the image from the electronic presentation is saved permanently embedding the new material in with the original material contained on the slide.

At step 112b, if the user chooses the manual edit changes option, presentation device 14 allows the user to alter the manual input by returning the program to step 104, placing the input screen back into input mode.

At step 112c, if the user chooses the computer edit changes option, presentation device 14 allows the presenter to alter or move the manual input by way of mouse or keyboard functions via presentation device 14. These computer edit changes include but are not limited to deleting of, movement of, reversing of and changing the color of the new lines or shapes.

Figure 5:
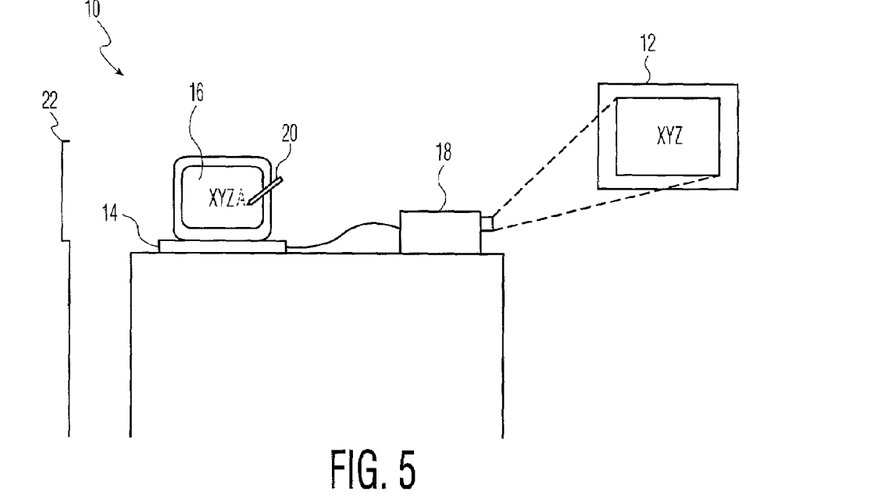
FIG. 5 is a displays system in accordance with another embodiment of the present invention.

Finally, at step 114, after presentation device 14 is finished with performing the presenter's commands, the electronic presentation continues to the next image or slide according to the original program. The user at any time can reinitiate the manual edit functions of system 10 for a subsequent slide by repeating steps 104–114 as often as necessary on as many of the slides or images as the presenter so chooses until the end of the presentation. An illustration of system 10 with a modified electronic presentation image is provided in FIG. 5.

Networked Presentation Display System

In another embodiment of the present invention, system 10 can be incorporated into a network for use in conjunction with multiple users, allowing for a presenter and the attendees to interact via the electronic presentation, where the manual edit lines and shapes appear not only as a result of the presenters manual input, but also as a result of the attendees manual input entered directly from their respective seats in the room.

Structure

Figure 6:
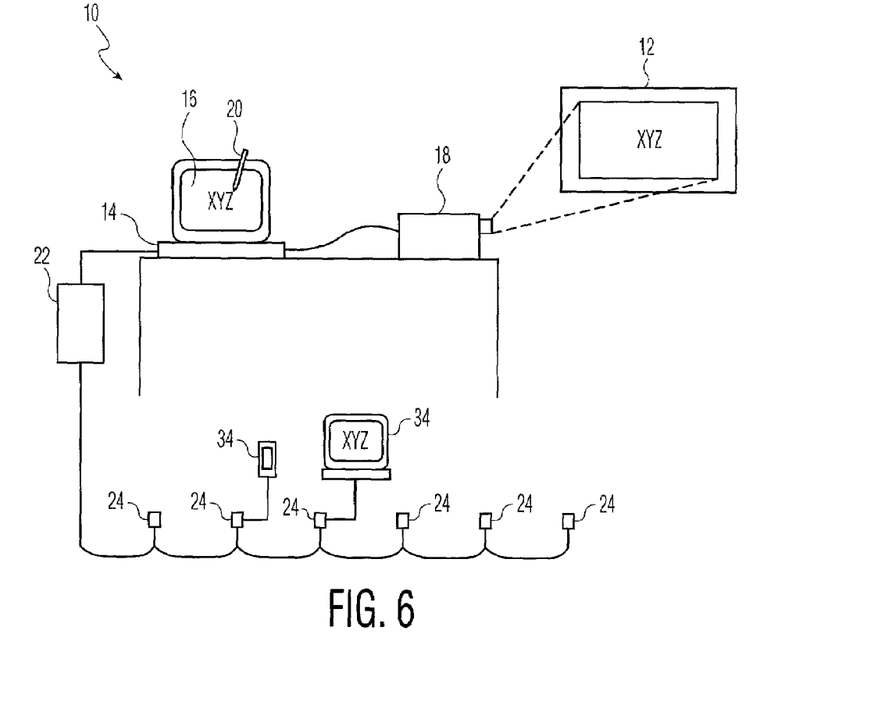
FIG. 6 is a displays system in accordance with another embodiment of the present invention.

To this end, as illustrated in FIG. 6, system 10 may further comprise a network unit 22, coupled to presentation device 14 configured to provide two way communication between presentation device 14 and at least one remote user node 24. Various components of system connected to network unit 22 and any number of remote user nodes 24 may employ either wireless or wired connections or some combination of the two. Although, wired communications are depicted in the figures, these illustrations are intended only as examples, and any available communication method either wireless or wired between the components discussed below are with in the contemplation of the present invention.

Remote user node 24, is configured to provide a means for an attendee of a seminar or meeting to link directly to presentation device 14 so as to allow the attendee to interact directly with the electronic presentation slides or images. It is noted that in accordance with an embodiment of the present invention, not all of the attendees are required to be in the same geographic location. A remote network connection, connecting attendees and presenters located at various geographic locations is also contemplated.

Figure 7:
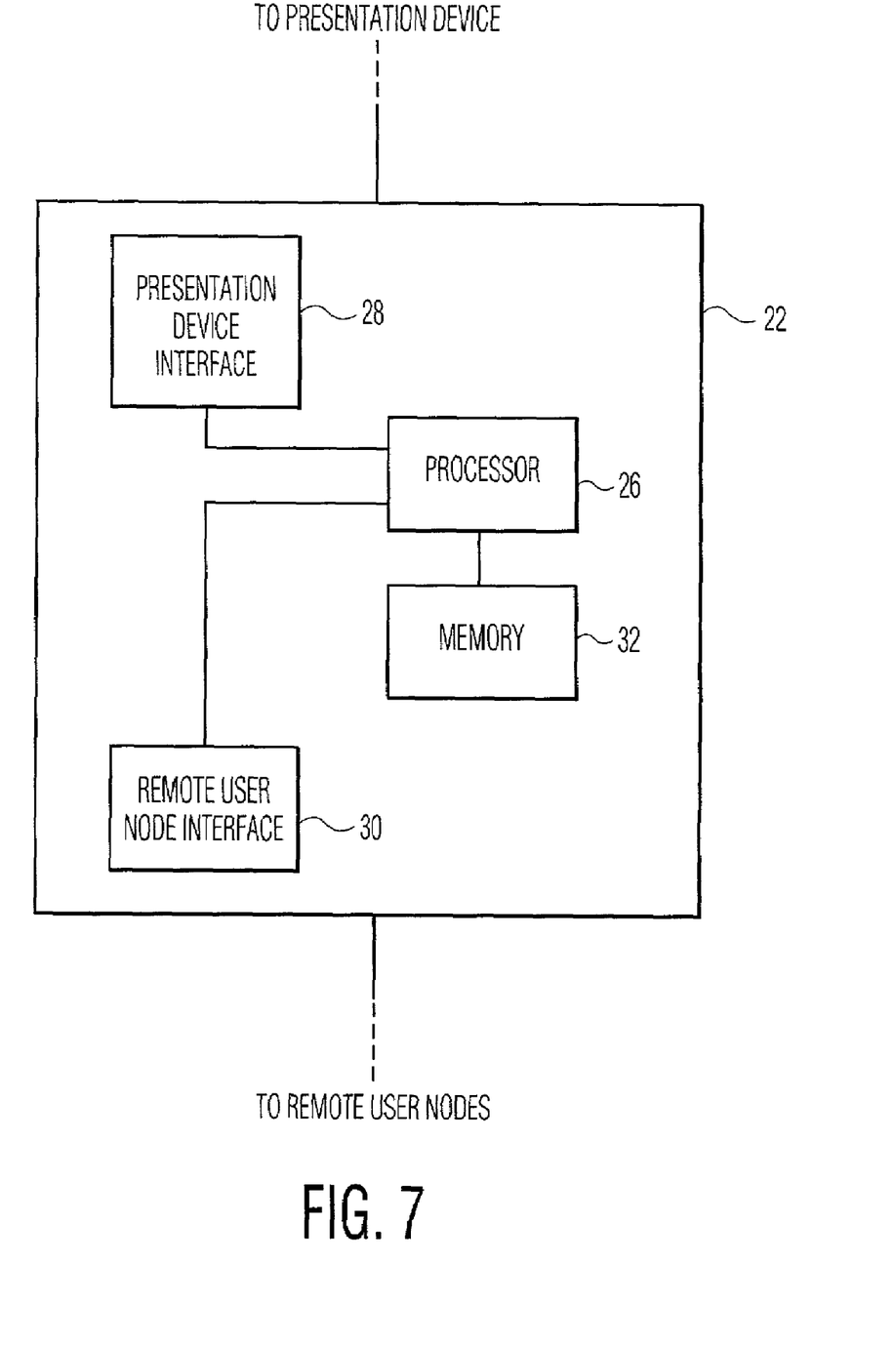
FIG. 7 is a module diagram of a network device in accordance with one embodiment of the present invention.

Network unit 22, as illustrated in FIG. 7, is comprised of processor module 26, a presentation device interface module 28, a remote user node interface module 30 and a memory module 32.

Processor module 26 is configured to couple and control presentation device interface module 28 and remote user node interface module 30. Memory module 32 is configured to provide any buffering memory required for the data transfer functions of network unit 22 as well as providing memory for any necessary operation software used by processor module 26. Presentation device interface module 28 and remote user node interface module 30 are both configured to handle the data flow between remote user nodes 24 and presentation device 14. For example, when running an electronic presentation on presentation module 14, the images or slides can be transmitted directly to the attendees seated at remote user nodes 24. Additionally, when edits are entered by either the presenter or the attendees interface modules 28 and 30 control the flow of the information such that presentation device 14 and all remote user nodes 24 all display the same updated information. It should be noted that, as described previously, if a presenter or an attendee wish to work on a blank slide, presentation device 14 can prompt them with a blank slide. When the presenter or attendee finishes their notations, presentation device 14 either saves the notations or discards them base upon the users instructions.

In one embodiment of the present invention, as illustrated in FIG. 6, remote user node 24 is a link for connecting a personal viewing device 34, such a notebook or laptop computer or a personal electronic device such as PalmPilot (TM). In this configuration the network unit and remote user nodes 24 are placed about the room such that any attendee can interface with the electronic presentation provided they have the appropriate software. This format is conducive for class room settings where attendees may have there own personal viewing device 34 or they can be provided with one upon entering the lecture by the presenter, to be returned at the completion.

Figure 8:
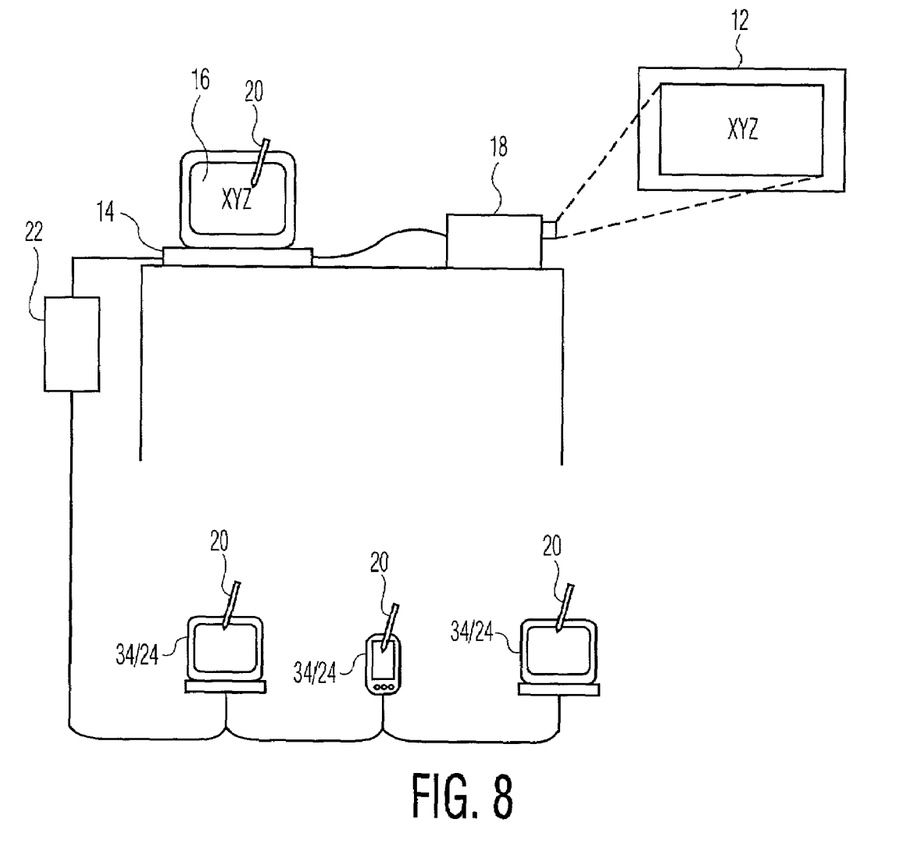
FIG. 8 is a displays system in accordance with another embodiment of the present invention.

In another embodiment of the present invention, as illustrated in FIG. 8, remote user node 24 and personal viewing device 34 are integrated. This configuration is a more permanent design than described above, and is more conducive for use in an office setting where the attendees of meetings and such are likely to be the same day to day. This format allows for configuration of the remote user nodes 24/personal viewing devices 34 to be better tailored to the users that will be using the devices day to day. Additionally, this configuration will allow for better software control and cut down on the amount of maintenance and delays caused by the constant interfacing of multiple devices with network unit 22. For the purposes of illustration, the configuration of system 10 seen in FIG. 5 will be used, but it should be noted that any system which employs a presentation device which connects to attendees devices via a network unit for use in electronic presentation interaction is within the contemplation of the present invention.

Operation

Figure 9:
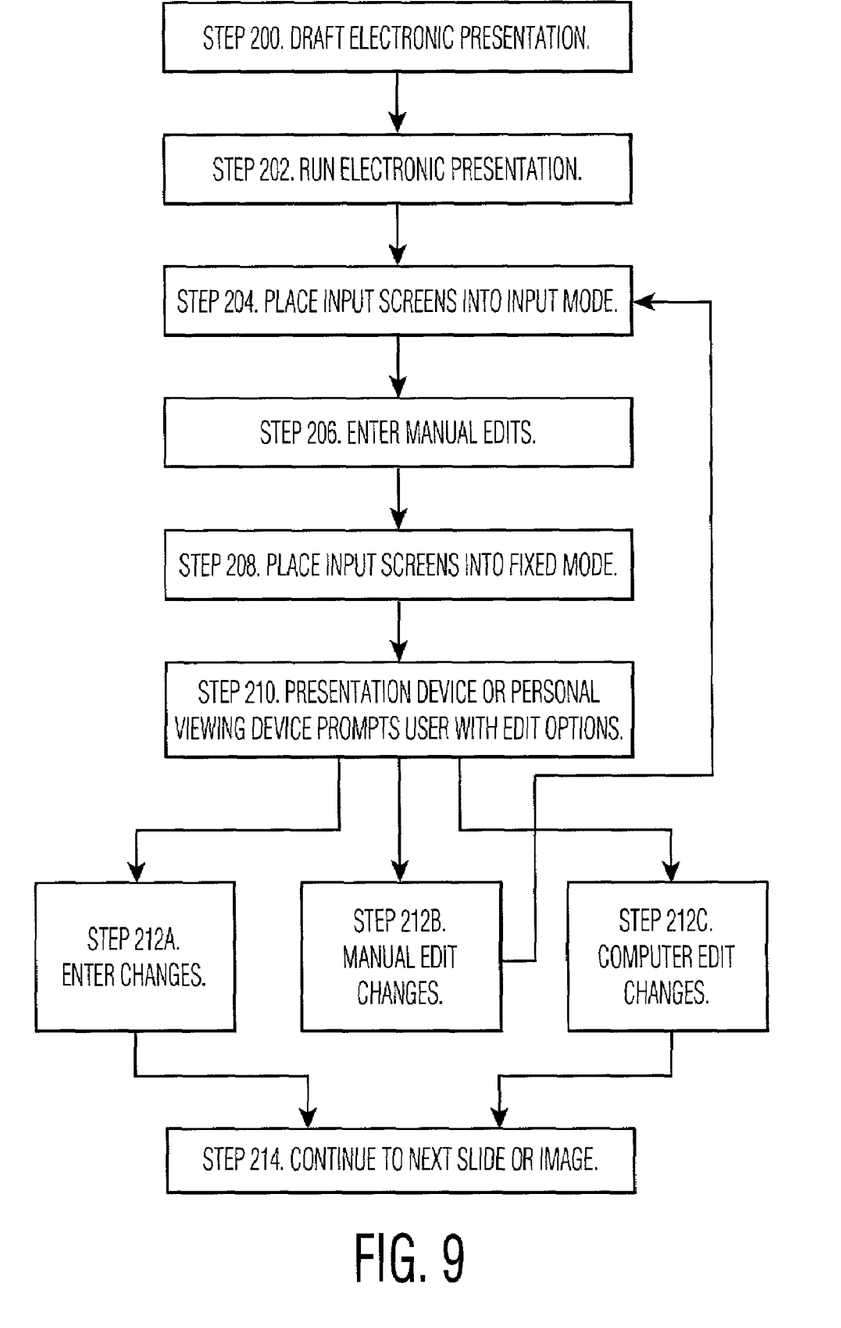
FIG. 9 is a flow diagram of the operation of a display system in accordance with another embodiment of the present invention.

In one embodiment of the present invention, as illustrated in FIG. 9, at first step 200, a presenter creates a electronic presentation for use on presentation device 14. Next, at step 202, the presenter begins operation of system, 10 by running the electronic presentation on presentation device 14 such that the images from the electronic presentation are projected via projection unit 18 onto display screen 12 allowing attendees of the conference or seminar to view the individual presentation slides. Additionally, the images or slides are also sent via network unit 22 at least on remote user node 24 and/or connected personal viewing device 34 so that attendees can not only view the electronic presentation on display screen 12 but they can also follow along on their own monitors.

The presentation continues using the normal methods of conducting a seminar or presentation until an event occurs in which the presenter is required to edit a slide, highlight an area of the slide, add or work on blank slide or complete the slide or any other function which would ordinarily require reprogramming or computer editing of the electronic presentation. Additionally, at the presenters control, via presentation device 14 and processor module 26 of network unit 22, a presenter can allow attendees to make there own edits via their own personal viewing devices 34 and/or remote user node 24 provided those device have similar capabilities to input screen 16 and are compatible with system 10.

At step 204, the presenter or attendee places input screen 16 or personal viewing device 34 into input mode, via control functions from presentation device 14 and/or personal viewing device 34. This can occur in several different ways depending on the electronic presentation format. For example, if the presenter wants an open format, the controls for placing input screen 16 or personal viewing device 34 into input mode would be in the hands of both the presenter and the attendees. However, if the presenter wishes to keep tighter control over attendee access then presentation device 14 can be used as a filter such that the presenter alone controls when, if at all, the attendees will have the ability to switch their personal viewing devices 34 into input mode. For illustration purposes we will assume an open format for the electronic presentation where at any time the presenter or any of the attendees can use the input mode for their personal viewing devices 34 or input screen 16.

At step 206, the presenter or attendee enters lines or figures onto input screen 16 or onto the appropriate surface on personal viewing devices 34 using marking device 20. The markings placed on the devices are then incorporated by presentation device 14, altering the electronic presentation image to include the newly manually drawn material, as displayed on display screen 12, on input screen 16, on all linked personal viewing devices 34, and on the monitor of presentation device 14 if this is a separate component from input screen 16.

Next, at step 208, after the presenter or attendee completes the manual drawing, the creator of the new material places input screen 16 or personal viewing device 34 back into fixed mode via controls in presentation device 14 and/or personal viewing device 34. The controls and the level of attendee participation in this control is varied depending on the level of viewer participation for the particular electronic presentation consistent with the control as described in step 204. In fixed mode, input screen 16 and personal viewing devices 34 are not sensitive to any manual input, so as to prevent unwanted accidental touching and other inadvertent contact from becoming a permanent part of the images of the electronic presentation.

Sometime thereafter, either after each manual input or at some other desired interval, as controlled by the presenter via controls on presentation device 14, at step 210, presentation device 14 prompts the presenter to select from a series of options as to how to proceed with the newly added material.

At step 212*a*, if the presenter chooses the enter changes option, presentation device 14 saves the editing lines and figures entered by the presenter or attendee, such that the image from the electronic presentation is saved, permanently embedding the new material in with the original material contained on the slide.

At step 212b, if the presenter chooses the manual edit changes option, presentation device 14 allows the presenter or the attendee to alter the manual input by returning the program to step 104, placing input screen 16 or personal viewing device 34 back into input mode.

At step 212c, if the presenter chooses the computer edit changes option, presentation device 14 allows the presenter or attendee to alter or move the manual input by way of mouse or keyboard function via presentation device 14 or by similar means on personal viewing device 34. These computer edit changes include but are not limited to deleting, movement of, reversing of and changing the color of the new lines or shapes.

It should be noted that control over the editing steps 212a–212c are again in the ultimate control of the presenter depending upon the amount of attendee participation the presenter wishes to use during the electronic presentation.

Finally, at step 214, after presentation device 14 is finished with performing the presenter's and attendee's commands, the electronic presentation continues to the next image or slide according to the program. The presenter at any time can reinitiate the manual edit functions of the system for a subsequent slide by repeating steps 204–214 as often as necessary on as many of the slides or images as the presenter so chooses until the end of the presentation.

While only certain features of the invention have been illustrated and described herein, many modifications, substitutions, changes or equivalents will now occur to those skilled in the art. It is therefore, to be understood that this application is intended to cover all such modifications and changes that fall within the true spirit of the invention.

What is claimed is:

1. A presentation display system comprising:
   a presentation device comprising a display screen for displaying an electronic presentation;
   an input screen coupled to said presentation device such that when a presenter enters a notation on said input screen said presentation device incorporates said notation into said electronic presentation; and
   a presentation network device configured to network a plurality of remote user nodes to said presentation device, said presentation network device being configured to provide electronic display information from said electronic presentation to each of said plurality of remote user nodes,
   wherein said presentation network device is configured to provide said presentation device and said remote user nodes with added viewer notations added in conjunction with said electronic presentation at a respective input screen at any one of said remote user nodes such that said presentation device and each of said remote user nodes display said electronic presentation in combination with said added viewer notations; and
   wherein said system includes means for providing a blank slide to one of the input screens, means for storing tentative notations made to that blank slide independent of said electronic presentation by the user of the blank slide, and means controlled by said user of the blank slide for discarding the tentative notations or saving the tentative notations and transmitting the tentative notations to the presentation network device.

2. A presentation display system as claimed in claim 1, further comprising a projection unit coupled to said presentation device configured to project said electronic presentation onto said display screen, wherein said projection unit is further comprised of:
   an interface unit configured to interface said projection unit with said presentation device and said input screen;
   a projection unit memory module; and
   a projection unit processor, said projection unit processor configured to create an image formed from said incorporated notation and said electronic presentation.

3. The presentation display system as claimed in claim 1, wherein said presentation device is a Personal Computer (PC) configured to operate an electronic presentation program.

4. The presentation display system as claimed in claim 1, wherein said remote user nodes are links for attaching a personal viewing device to said presentation display system, said personal viewing devices being any one of a Personal Computer (PC), a handheld computer/organizer and a Notebook computer.

5. The presentation display system as claimed in claim 1, wherein said remote user nodes are personal viewing devices, said personal viewing devices being any one of a Personal Computer (PC), a handheld computer/organizer and a Notebook computer.

6. The presentation display system as claimed in claim 1, wherein any one of said remote user nodes are located in different geographic location from said presentation device, and remaining said remote user nodes.

* * * * *